(12) United States Patent
Konishi

(10) Patent No.: US 12,038,715 B2
(45) Date of Patent: Jul. 16, 2024

(54) CAM DRIVER, TRANSFER DEVICE, AND IMAGE FORMING APPARATUS

(71) Applicant: Takahiro Konishi, Tokyo (JP)

(72) Inventor: Takahiro Konishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/363,080

(22) Filed: Aug. 1, 2023

(65) Prior Publication Data

US 2023/0375975 A1    Nov. 23, 2023

Related U.S. Application Data

(63) Continuation of application No. 17/929,037, filed on Sep. 1, 2022, now Pat. No. 11,754,964.

(30) Foreign Application Priority Data

Sep. 21, 2021 (JP) .................. 2021-152762
Mar. 17, 2022 (JP) .................. 2022-042342

(51) Int. Cl.
| | |
|---|---|
| *G03G 21/16* | (2006.01) |
| *F16H 7/08* | (2006.01) |
| *F16H 25/16* | (2006.01) |
| *G03G 15/01* | (2006.01) |
| *G03G 15/16* | (2006.01) |

(52) U.S. Cl.
CPC ......... *G03G 21/1647* (2013.01); *F16H 25/16* (2013.01); *G03G 15/0136* (2013.01); *G03G 15/1615* (2013.01); *G03G 21/168* (2013.01)

(58) Field of Classification Search
CPC ........... G03G 15/0136; G03G 15/1605; G03G 15/1615; G03G 21/1647; G03G 21/168; F16H 25/16
See application file for complete search history.

(56) References Cited

U.S. PATENT DOCUMENTS

| | | | |
|---|---|---|---|
| 5,983,062 | A | 11/1999 | Sameshima |
| 11,754,964 | B2* | 9/2023 | Konishi ................. F16H 25/16 399/308 |
| 2004/0013452 | A1 | 1/2004 | Choi |
| 2010/0310292 | A1 | 12/2010 | Furukawa et al. |
| 2013/0322910 | A1 | 12/2013 | Shiga et al. |
| 2014/0147160 | A1 | 5/2014 | Konishi |
| 2015/0043928 | A1 | 2/2015 | Konishi et al. |
| 2015/0050080 | A1 | 2/2015 | Morita et al. |
| 2015/0346643 | A1 | 12/2015 | Konishi et al. |

(Continued)

FOREIGN PATENT DOCUMENTS

| | | |
|---|---|---|
| JP | 2015-225324 | 12/2015 |
| JP | 2018-097066 | 6/2018 |
| JP | 2019-159142 | 9/2019 |

OTHER PUBLICATIONS

Extended European Search Report for 22196276.4 mailed on Feb. 15, 2023.

*Primary Examiner* — Sophia S Chen
(74) *Attorney, Agent, or Firm* — IPUSA, PLLC

(57) ABSTRACT

A cam driver includes a support, a cam, a motor, and a retracting torque applicator. The support supports an object. The cam moves the support. The motor rotates the cam and maintains a position of the cam. The retracting torque applicator applies torque to the cam in a direction to move the object away from a counter object that faces the object.

12 Claims, 11 Drawing Sheets

(56) References Cited

U.S. PATENT DOCUMENTS

| | | |
|---|---|---|
| 2015/0346651 A1 | 12/2015 | Nagata et al. |
| 2017/0010566 A1 | 1/2017 | Kato et al. |
| 2017/0168429 A1 | 6/2017 | Imai et al. |
| 2018/0164720 A1 | 6/2018 | Nagata et al. |
| 2020/0064765 A1 | 2/2020 | Suga et al. |
| 2020/0133172 A1 | 4/2020 | Konishi et al. |
| 2020/0333731 A1 | 10/2020 | Murakami |

\* cited by examiner

- DETENT TORQUE ON CAM
- TOLERANCE (MOTOR MAX. TORQUE)
- SPIRAL SPRING TORQUE

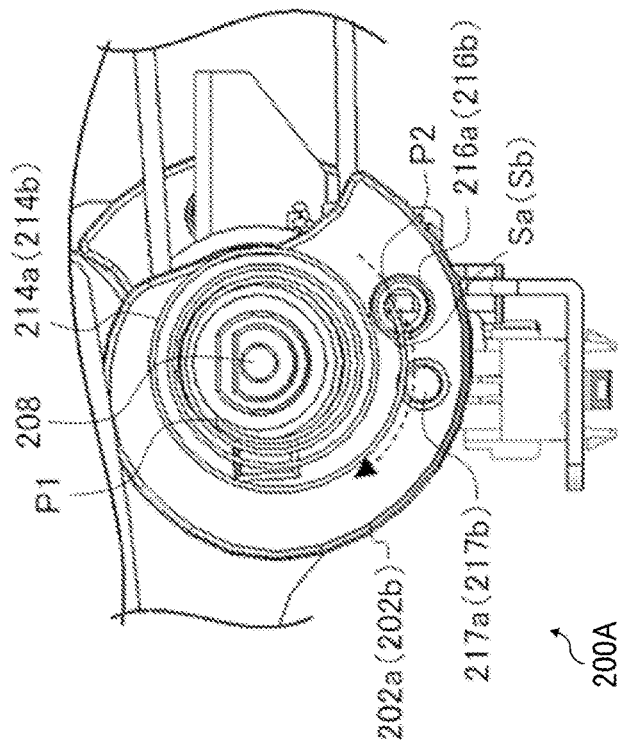
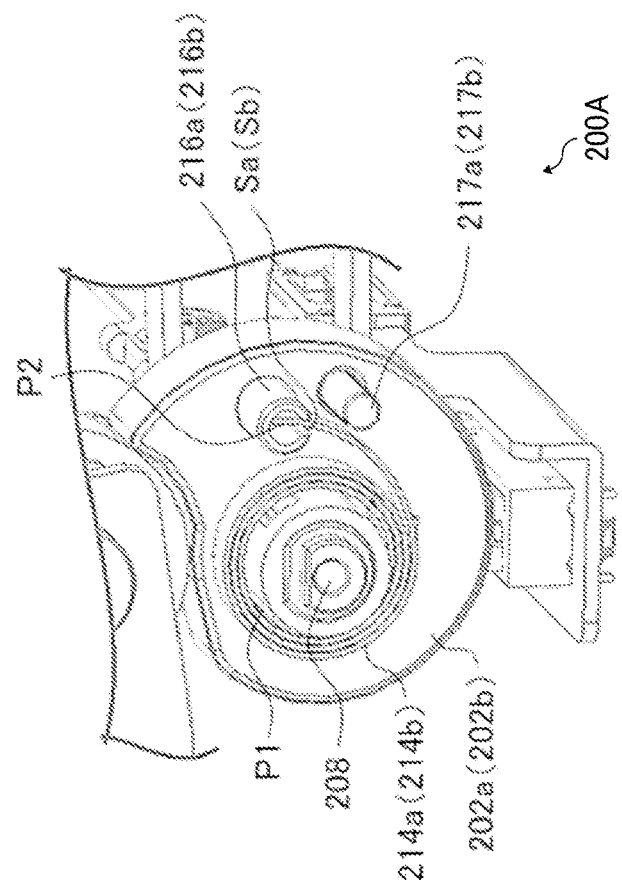
FIG. 7A
FIG. 7B

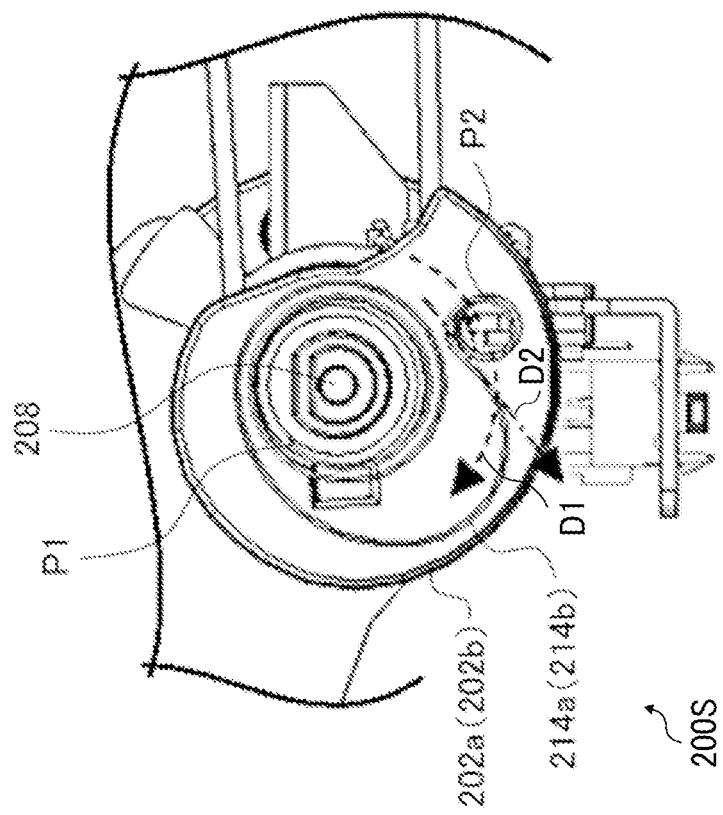
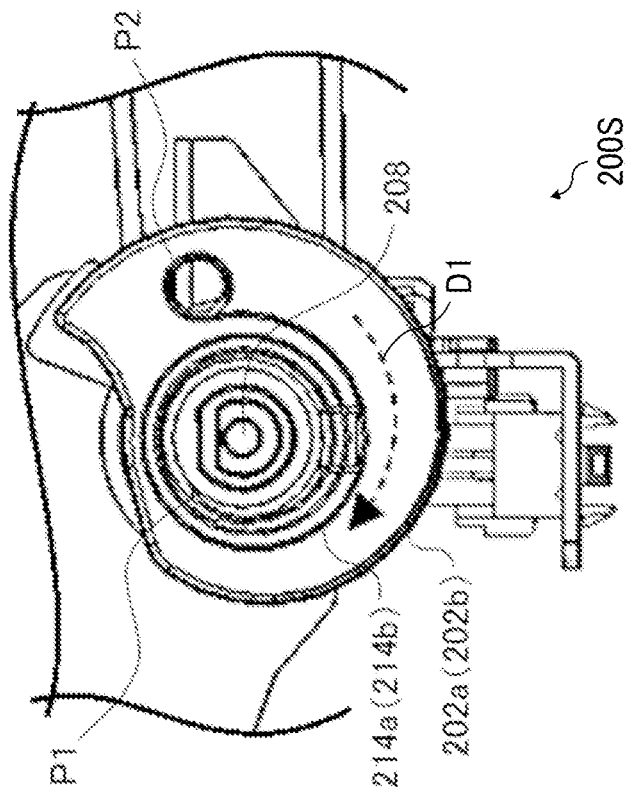

CAM DRIVER, TRANSFER DEVICE, AND IMAGE FORMING APPARATUS

CROSS-REFERENCE TO RELATED APPLICATIONS

The present application is a continuation application of U.S. patent application Ser. No. 17/929,037 filed on Sep. 1, 2022, which is based on and claims priority under 35 U.S.C. § 119 to Japanese Patent Application Nos. 2021-152762, filed on Sep. 21, 2021, and 2022-042342, filed on Mar. 17, 2022, in the Japan Patent Office, the entire disclosure of each of which is hereby incorporated by reference herein.

BACKGROUND

Technical Field

Embodiments of the present disclosure relate to a cam driver, a transfer device, and an image forming apparatus.

Background Art

A cam driver in the related art includes an eccentric cam, a ball bearing to change the position in response to the change of the rotation position of the eccentric cam that is in contact with the ball bearing, a stepper motor serving as a rotation drive source that rotates the eccentric cam; and a power source to output electric current to be supplied to the stepper motor. The cam driver in the related art further includes a controller to control the electric current value output from the power source so that the electric current to generate stalling torque to the stepper motor while the stepper motor is stopped can be different in accordance with the difference of the rotation stop position of the eccentric cam. Due to such a configuration disclosed as described above, the cam driver can reduce the amount of power consumption increased due to the stoppage of the rotations of the eccentric cam at a rotation stop position to contact the non-centric curved portion of the eccentric cam to the ball bearing.

In the configuration of the cam driver in the related art, when the stepper motor is unable to drive due to, for example, a motor failure while a secondary transfer roller and a secondary transfer backup roller form the secondary transfer nip region, the secondary transfer nip region is kept pressed.

SUMMARY

Embodiments of the present disclosure described herein provide a novel cam driver including a support, a cam, a motor and a retracting torque applicator. The support supports an object. The cam moves the support. The motor rotates the cam and maintains a position of the cam. The retracting torque applicator applies torque to the cam in a direction to move the object away from a counter object that faces the object.

Further, embodiments of the present disclosure described herein provide a transfer device including the above-described cam driver.

Further, embodiments of the present disclosure described herein provide an image forming apparatus including the above-described cam driver.

Further, embodiments of the present disclosure described herein provide an image forming apparatus including a transfer device including the above-described cam driver.

BRIEF DESCRIPTION OF THE SEVERAL VIEWS OF THE DRAWINGS

Exemplary embodiments of this disclosure will be described in detail based on the following figures, wherein:

FIG. 4 is a side view of a cam driver according to an embodiment of the present embodiment, for explaining a failure when a motor is not turned on;

FIGS. 7A and 7B are diagrams each illustrating a cam driver according to a second embodiment of the present disclosure;

FIGS. 8A and 8B are diagrams each illustrating a cam driver of a control sample to the cam driver of FIGS. 7A and 7B according to the second embodiment;

Figure 1:
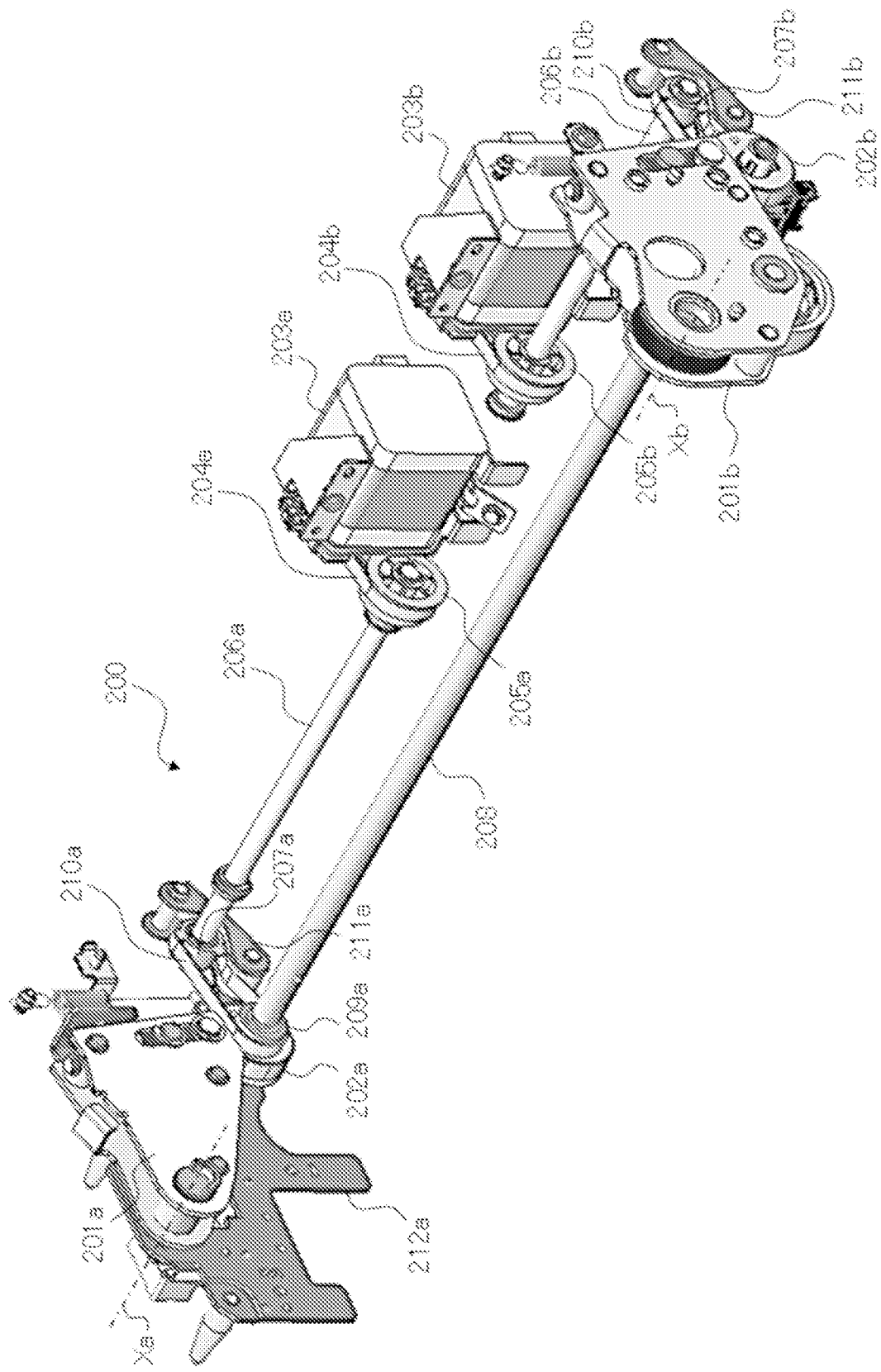
FIG. 1 is a perspective view of a cam driver according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiments of the present disclosure are described below with reference to the drawings.

FIG. 1 is a perspective view of an overall configuration of a cam driver according to an embodiment of the present disclosure.

A cam driver 200 includes arms 201a and 201b, cams 202a and 202b, and motors 203a and 203b. The motor 203a is rotatable in a forward direction or a reverse direction that is opposite to the forward direction. As the motor 203a is driven, the rotational force of the motor drive shaft of the motor 203a is transmitted to the shaft 206a via the timing belt 204a and the pulley 205a, thereby rotating the shaft 206a. The motor 203b has the like configuration as the motor 203a. Specifically, as the motor 203b is driven, the rotational force of the motor drive shaft of the motor 203b is transmitted to the shaft 206b via the timing belt 204b and the pulley 205b, thereby rotating the shaft 206b.

The shaft 206a is provided with a pulley 207a at one end. This end of the shaft 206a is the opposite end at which the pulley 205a is provided. A shaft 208 is disposed in parallel with the shaft 206a and is provided with a pulley 209a at one end of the shaft 208. A timing belt 210a is wound around the pulley 209a and the pulley 207a provided for the shaft 206a. The shaft 206b has the like configuration as the shaft 206b and is provided with a pulley 207b at one end. This end of the shaft 206b is the opposite end at which the pulley 205b is provided. The shaft 208 is also in parallel with the shaft 206b.

The shaft 208 is also provided with a pulley at the opposite end that is opposite to the end at which the pulley 209a is provided. A timing belt 210b is wound around the pulley at the opposite end of the shaft 208 and the pulley 207b provided for the shaft 206b.

Due to such a configuration, the rotational force of the shaft 206a is transmitted to the shaft 208 via the pulley 207a, the timing belt 210a, and the pulley 209a. Similarly, the rotational force of the shaft 206b is transmitted to the shaft 208 via the pulley 207b, the timing belt 210b, and the pulley at the opposite end of the shaft 208. As a result, the shaft 208 rotates. A tensioner 211a contacts the timing belt 210a on the outer face of the timing belt 210a to moderately apply tension to the timing belt 210a. Similarly, a tensioner 211b contacts the timing belt 210b on the outer face of the timing belt 210b to moderately apply tension to the timing belt 210b.

The cam 202a is attached to one end (i.e., a portion protruding outward from the pulley 209a) of the shaft 208 and the cam 202b is attached to the opposite end of the shaft 208. The cams 202a and 202b are fitted to the outer circumference of the shaft 208. Further, the cams 202a and 202b are attached to the shaft 208 by fitting, for example, respective keys extending along the outer circumference of the shaft 208 to respective key grooves formed in the cams 202a and 202b, so that the shaft 208 engages with each of the cams 202a and 202b.

Due to the above-described configuration, as the shaft 208 rotates, the cams 202a and 202b rotate together with the shaft 208.

The cam driver 200 includes a housing frame 212a to support the arm 201a so that the arm 201a can rotate around an axis Xa as a fulcrum. Similarly, the cam driver 200 further includes another housing frame 212b near the arm 201b, like the housing frame 212a near the arm 201a, to support the arm 201b so that the arm 201b can rotate around an axis Xb as a fulcrum. The arm 201a is provided with a cam follower (described below) at the position to face the cam 202a, and contacts the cam surface of the cams 202a. Similarly, the arm 201b is provided with another cam follower (described below) at the position to face the cam 202b and contacts the cam surface of the cams 202b. Due to the above-described configurations, as the cam 202a rotates, the cam follower facing the cam 202a moves along the shape of the cam surface, so that the arm 201a rotates around the axis Xa as a fulcrum along with movement of the cam follower. Similarly, as the cam 202b rotates, the cam follower facing the cam 202b moves along the shape of the cam surface, so that the arm 201b rotates around the axis Xb as a fulcrum along with movement of the cam follower.

The motors 203a and 203b according to the present embodiment are hybrid stepper motors and are driven on pulses of a constant frequency to move the cams 202a and 202b by respective given angles of rotation. Thereafter, each of the motors 203a and 203b generates holding torque to hold a corresponding one of the cams 202a and 202b at a position moved by the given angle of rotation. Even when the motors 203a and 203b are not turned on, detent torque is generated to the motor drive shaft of each of the motors 203a and 203b. The detent torque is required to rotate the drive shaft of a motor when the motor is not turned on. In the present embodiment, the motors 203a and 203b are provided for driving the cams 202a and 202b, respectively. However, the present disclosure is not limited to this configuration. For example, the shafts 206a and 206b may be unified as a single unit, and the cam 202a attached to one end of the unified shaft and the cam 202b attached to the opposite end of the unified shaft may be driven by a single motor.

Note that each of the arms 201a and 201b serves as a "support", each of the cams 202a and 202b serves as a "cam", and each of the motors 203a and 203b serves as a "motor". The shaft 208 serves as a "rotary shaft", and each of the axes Xa and Xb serves as an "axis of rotation".

Figure 2:
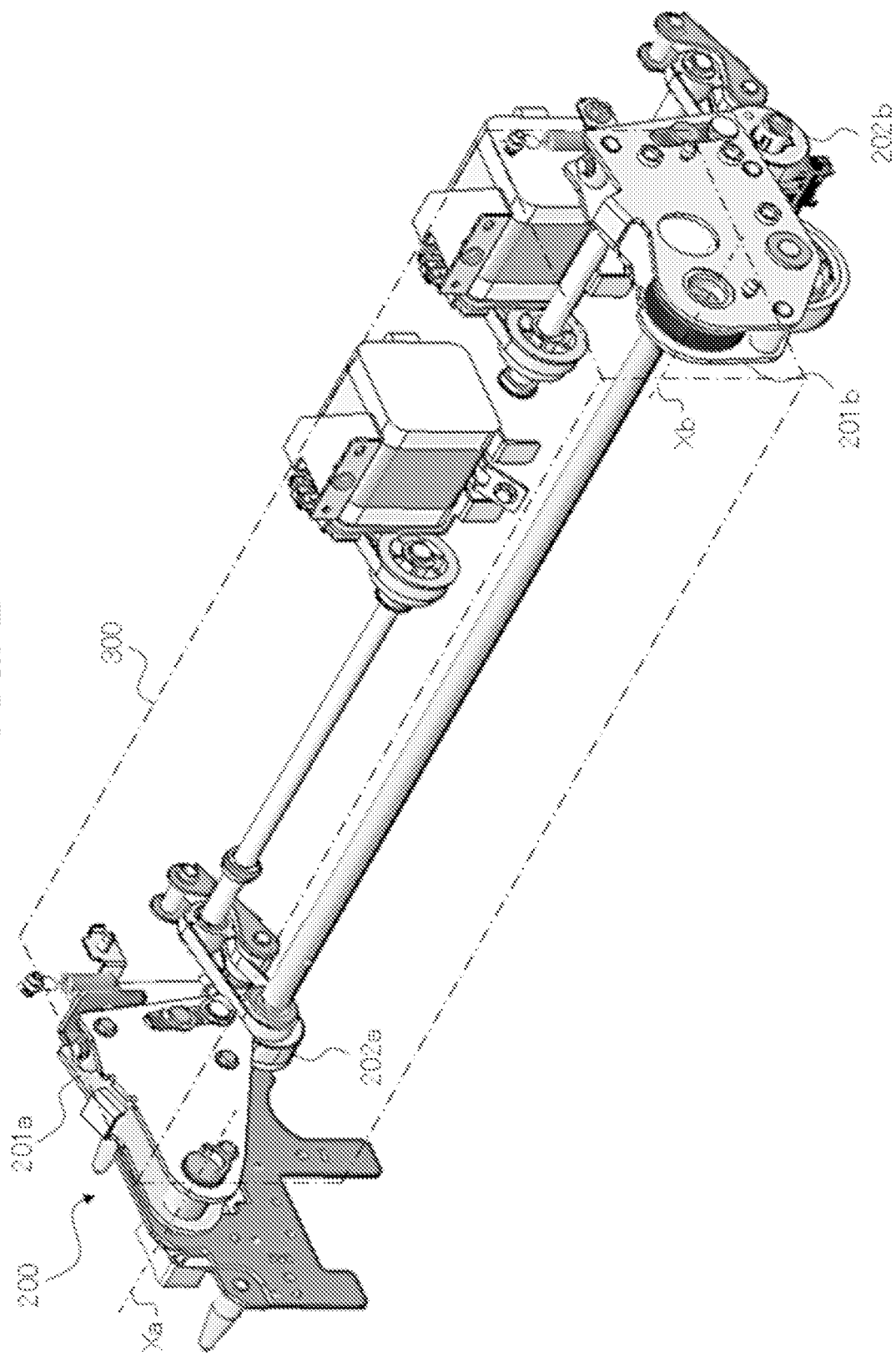
FIG. 2 is a perspective view of a cam driver according to an embodiment of the present disclosure, with an object unit being mounted on the cam driver.

FIG. 2 is a perspective view of the cam driver 200 on which an object unit 300 is mounted, according to an embodiment of the present disclosure.

The cam driver 200 can support the object unit 300 indicated by a broken line in FIG. 2, between the arms 201a and 201b. In other words, the arms 201a and 201b of the cam driver 200 can support the object unit 300. Due to the above-described configurations, as the cams 202a and 202b rotate, the respective cam followers on the arms 201a and 201b move along the shapes of the cam surfaces of the cams 202a and 202b, so that the arms 201a and 201b rotate around the axes Xa and Xb as a fulcrum, respectively, along with movement of the respective cam followers. As a result, the object unit 300 rotates around the axes Xa and Xb as a fulcrum, together with the arms 201a and 201b.

Note that the shape of the object unit 300 is not limited to a box shape as illustrated in FIG. 2, and the shape and configuration of the arms 201a and 201b may be appropriately changed according to the shape and configuration of the object unit 300. The object unit 300 serves as an "object".

Figure 3:
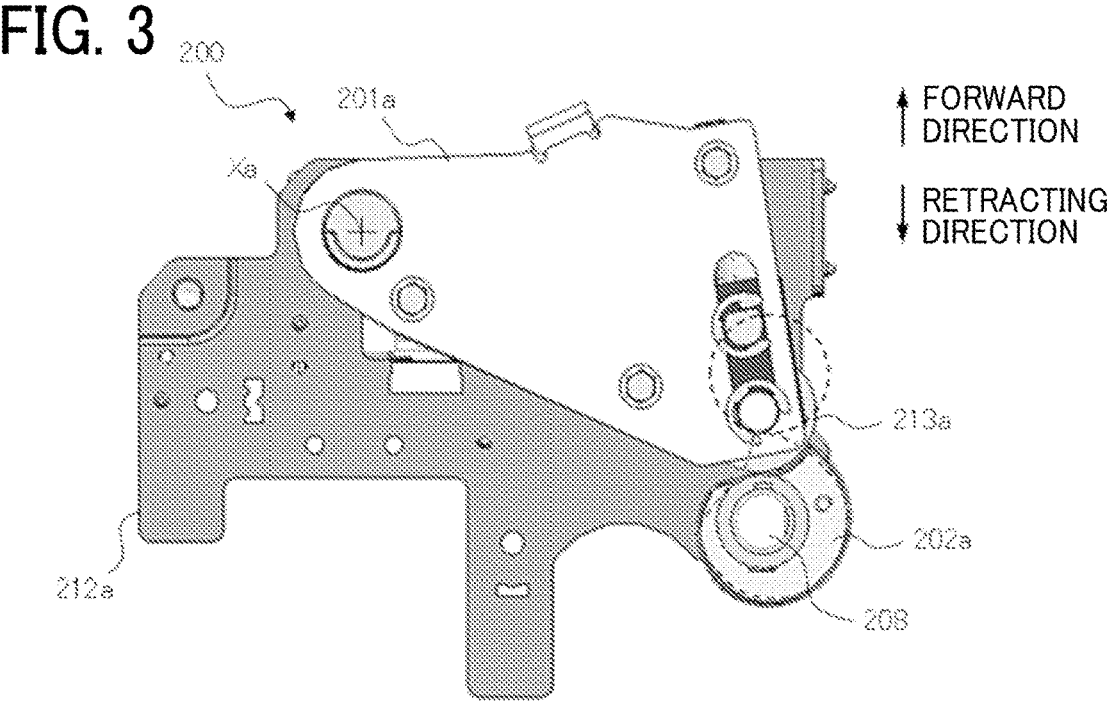
FIG. 3 is a side view of a cam driver according to an embodiment of the present disclosure, for explaining the movement of an arm along with the movement of a cam in the cam driver.

FIG. 3 is a side view of the cam driver of FIG. 1, according to an embodiment of the present disclosure, for explaining movement of an arm along with a cam in the cam driver.

As described above, the housing frame 212a of the cam driver 200 supports the arm 201a such that the arm 201a can rotate around the axis Xa as a fulcrum. The arm 201a includes a cam follower 213a at a position facing the cam 202a, and the cam follower 213a is in contact with the cam surface of the cam 202a.

In the present embodiment, when the cam 202a is at the position indicated by the solid line in FIG. 3, the cam follower 213a approaches most to the shaft 208. As a result, the arm 201a is moved to the most retracted position in the retracting direction of the arm 201a. When the cam 202a rotates clockwise around the shaft 208 as an axis to move to the position indicated by the broken line in FIG. 3, the cam 202a moves the cam follower 213a to the position indicated by the broken line in FIG. 3. As a result, the arm 201a is moved to the most forward position in the forward direction of movement of the arm 201a via the cam follower 213a.

When the cam 202a is to return from the position indicated by the broken line to the position indicated by the solid line in FIG. 3, the cam 202a rotates counterclockwise. Note that the description above has been given based on the configuration of the arm 201a in FIG. 3. Since the arm 201b has the like configuration as the arm 201a, the detailed description of the arm 201b is omitted.

Figure 4:
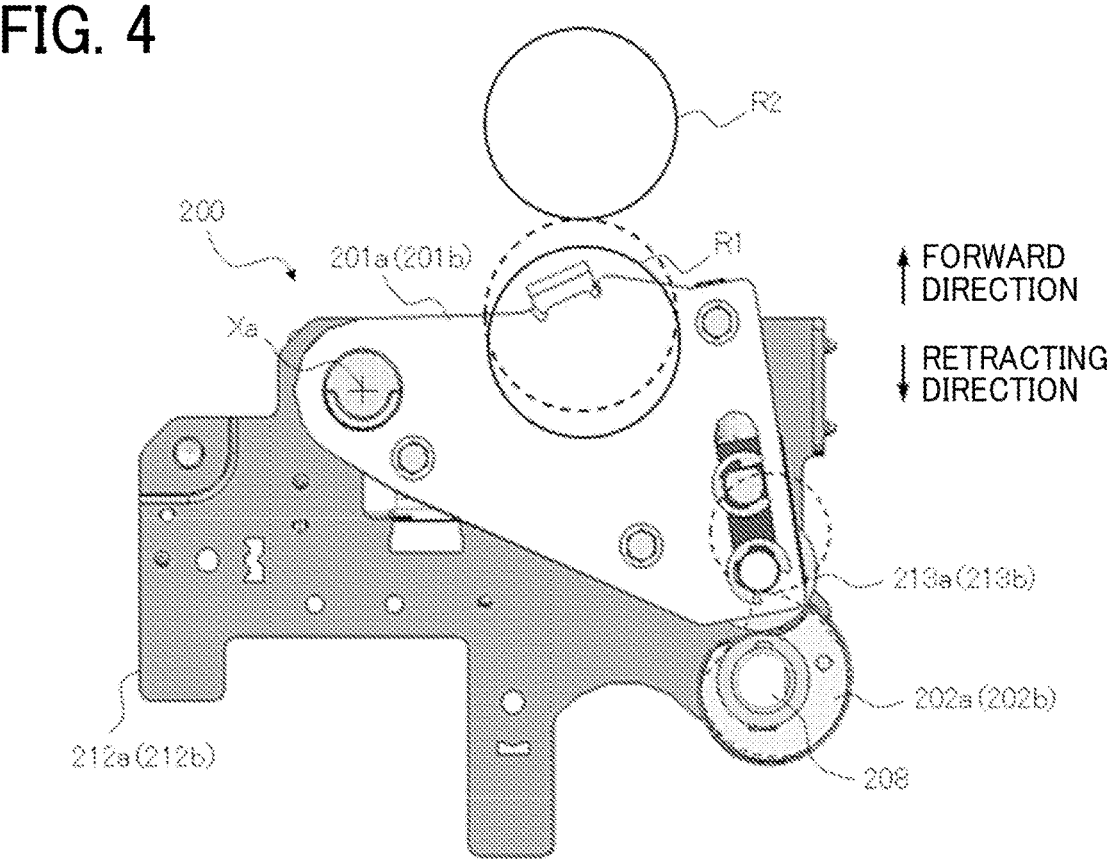

FIG. 4 is a side view of the cam driver of FIG. 1, according to an embodiment of the present embodiment, for explaining a failure when a motor is not energized.

A description is given of a case where the object unit 300 to be mounted on the cam driver 200 is a roller R1.

The arms 201a and 201b rotatably support the roller R1. When the cams 202a and 202b are at the positions indicated by the solid line in FIG. 4, the arms 201a and 201b are at the most retracted positions, and the roller R1 is at the position separated from a roller R2 as indicated by the solid line in FIG. 4. The roller R2 is fixed to a given position. When the cams 202a and 202b are rotated clockwise to move to the respective positions indicated by the broken lines, the arms 201a and 201b are at the most forward positions in the forward direction of movement of the arms 201a and 201b, so that the roller R1 presses the roller R2 as indicated by the broken lines in FIG. 4. The roller R1 also serves as an "object", and the roller R2 serves as a "counter object".

As described above, the motors 203a and 203b provided for the cam driver 200 are stepper motors. The motors 203a and 203b are driven on pulses of a constant frequency to move the cams 202a and 202b by respective given angles, then generate holding torque for holding the positions of the cams 202a and 202b. Even when the motors 203a and 203b are not turned on, detent torque is generated to the drive shafts of the motors 203a and 203b. The detent torque is required to rotate the drive shaft of a motor when the motor is turned off.

Due to generation of the detent torque, if a failure of the motors 203a and 203b or a power failure of the entire apparatus disables the motors 203a and 203b to be driven while the roller R1 is pressed against the roller R2, the rollers R1 and R2 are left pressed against each other. For example, if the rollers R1 and R2 serve as conveyors of a sheet such as a paper, the rollers R1 and R2 are arranged to be drawable from the apparatus for maintenance for fixing a paper jam. However, while being pressed against each other, the rollers R1 and R2 may not be drawn from the apparatus or may be damaged due to the drawing action.

To address this inconvenience, the cam driver 200 according to the present embodiment further includes a torque applicator to apply torque to the cams 202a and 202b to move the roller R1 in a direction away from the roller R2.

A description below is given of the configuration of a retracting torque applicator.

Figure 5:
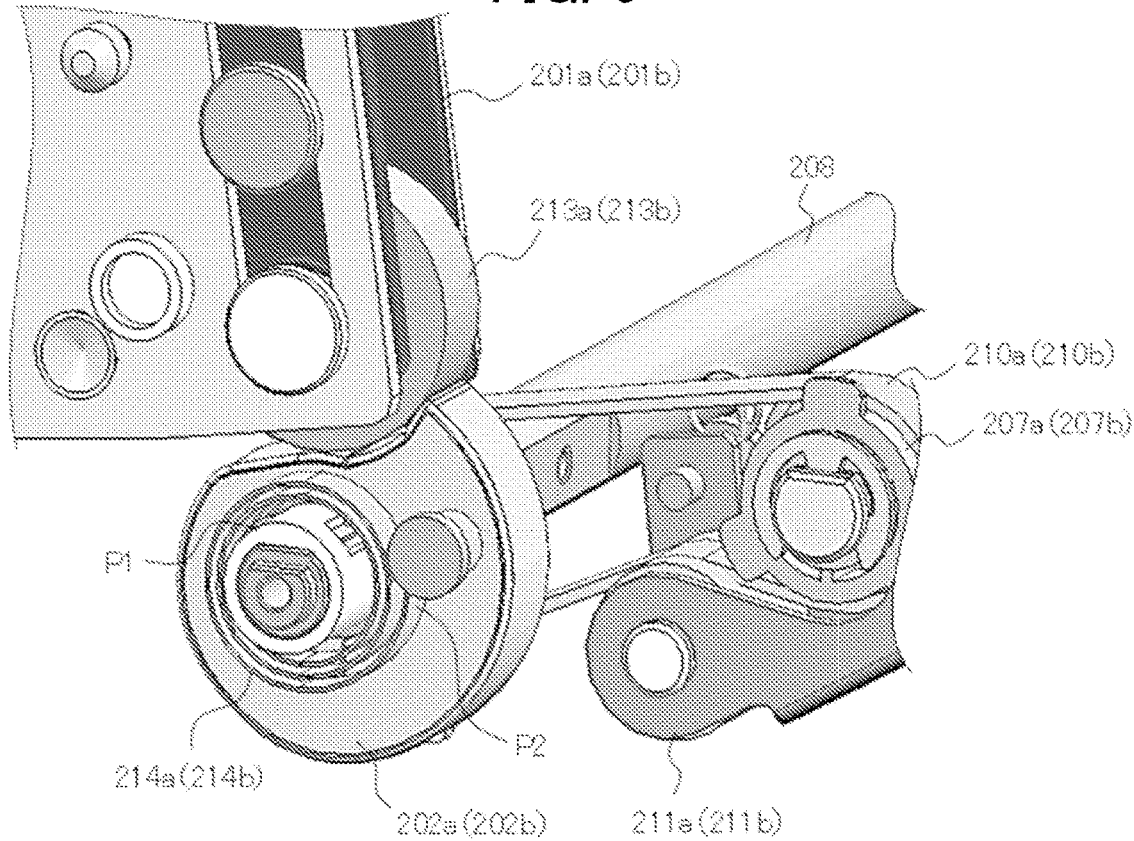
FIG. 5 is a diagram illustrating a retracting torque applicator included in a cam driver according to an embodiment of the present disclosure.

FIG. 5 is a diagram illustrating a retracting torque applicator included in the cam driver according to an embodiment of the present disclosure.

A description with reference to FIG. 5 is given of the configuration of a spiral spring as a retracting torque applicator. The cams 202a and 202b include spiral springs 214a and 214b, respectively. In the description below, the spiral springs 214a and 214b are collectively referred to as a spiral spring 214. The spiral center end P1 of the spiral spring 214 is fixed to the shaft 208 and the spiral outer end P2 of the spiral spring 214 is fixed to the side face of each of the cams 202a and 202b. In other words, the spiral spring 214 is disposed between the shaft 208 and each of the cams 202a and 202b. As the spiral spring 214 rotates in a winding direction, the outer diameter of the spiral decreases. As the spiral spring 214 rotates in an unwinding direction, i.e., the opposite direction to the winding direction, the outer diameter of the spiral increases. It is preferable that rotating the spiral spring 214 in the winding direction applies torque to move the cams 202a and 202b in the retracting direction.

When the cams 202a and 202b are located at the positions illustrated in FIG. 5, the spiral spring 214 does not apply torque in the retracting direction to the cams 202a and 202b. When the cams 202a and 202b rotate clockwise around the shaft 208 as an axis, the spiral spring 214 rotates in the unwinding direction, so that the spiral spring 214 deforms as the outer diameter of the spiral of the spiral spring 214 increases. While the spiral of the spiral spring 214 has such an increased outer diameter, resilience is generated to wind the spiral spring 214. Such resilience generates retracting torque.

As illustrated in FIG. 5, when the cams 202a and 202b rotate to the most retracted positions, the arms 201a and 201b (as well as the cam followers 213a and 213b) contact the cam surfaces of the cams 202a and 202b having the smallest radius. Due to such a configuration, it is preferable to select the spiral spring 214 that can deform within a range in which the spiral spring 214 does not interfere with the arms 201a and 201b and that can obtain a desired retracting torque.

Figure 6:
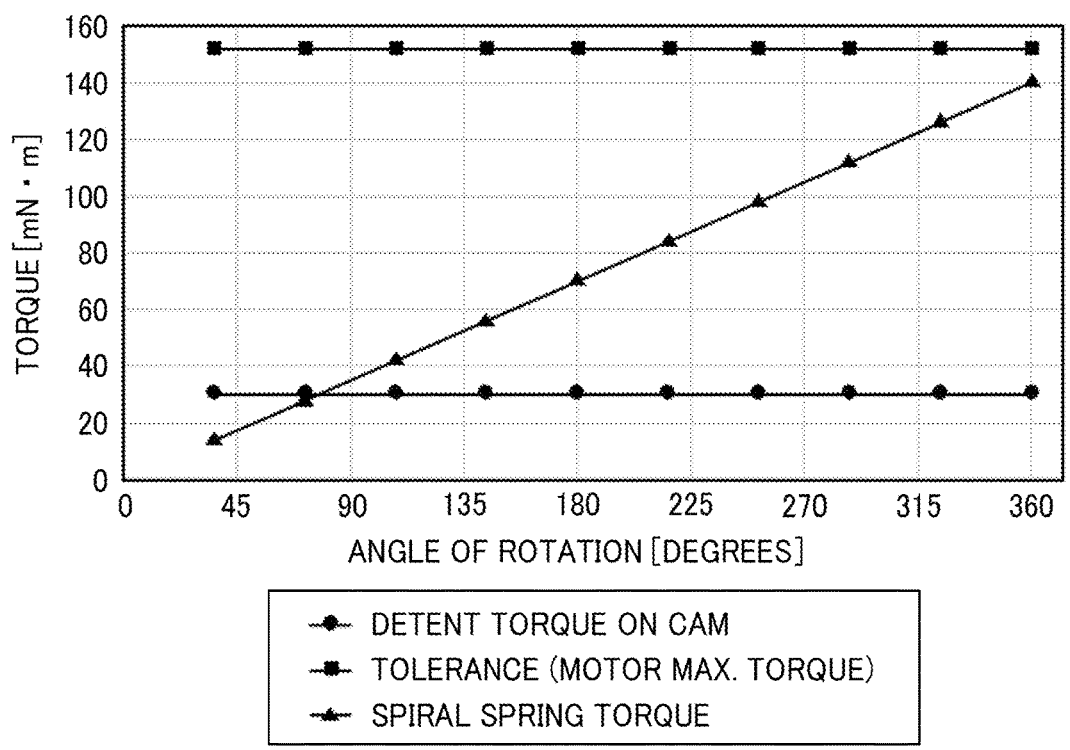
FIG. 6 is a diagram illustrating set torque values of the cam driver according to an embodiment of the present disclosure.

FIG. 6 is a diagram illustrating set torque values of the cam driver according to an embodiment of the present disclosure.

In the present embodiment, the tolerance value is the maximum torque of the motors 203a and 203b used for rotational driving and position holding of the cams 202a and 202b in the cam driver 200. The maximum torque of the motors 203a and 203b is hereinafter also referred to as "holding torque". The detent torque applied on the cam is required to rotate the respective drive shafts of the motors 203a and 203b when the motors 203a and 203b are turned off. The detent torque applied on the cam is also referred to simply as "detent torque". The spiral spring torque is generated by the spiral spring 214. The spiral spring torque is also referred to as "retracting torque".

Each of the holding torque, the detent torque, and the retracting torque is indicated as a conversion value on the rotation axis of the cam, in other words, as a torque value applied to the cams 202a and 202b on the shaft 208. The spiral spring torque (retracting torque) changes as illustrated in FIG. 6, depending on the angle of rotation of the spiral outer end P2 of the spiral spring 214. In order to automatically release the pressing of the cams 202a and 202b against the cam followers 213a and 213b, respectively, when the motors 203a and 203b are turned off, the retracting torque is set to act between the holding torque and the detent torque.

To be more specific, the magnitude relation of the holding torque, the retracting torque, and the detent torque is set to satisfy the inequality of T1≥T2>T3, where the holding torque is represented by "T1", the retracting torque is represented by "T2", and the detent torque is represented by "T3". More preferably, the magnitude relation is set to satisfy the inequality of T1>T2>T3. The component force acting as the retracting torque may change depending on, for example, the weight of the object unit 300 or the shape and configuration of the cams 202a and 202b, and the magnitude relation of these torques may be appropriately set based on, for example, the weight of the object unit or the shape of the cam.

As described above, the cam driver 200 according to the present embodiment includes the arms 201a and 201b that support the roller R1, the cams 202a and 202b that move the arms 201a and 201b, respectively, the motors 203a and 203b that rotate the cams 202a and 202b, respectively, and hold the positions of the cams 202a and 202b, respectively, and the spiral springs 214a and 214b that apply torque to the cams 202a and 202b, respectively, to move the roller R1 in the direction away from the roller R2 facing the roller R1.

As described above, the arms 201a and 201b has the axes Xa and Xb, respectively. The arms 201a and 201b rotate around the axes Xa and Xb, respectively, along with rotations of the cams 202a and 202b, respectively, to move the roller R1 back and forth with respect to the roller R2 and to locate the cams 202a and 202b at the positions lower than the positions of the axes Xa and Xb.

Further, as described above, the magnitude relation of the holding torque T1 generated by the motors 203a and 203b to hold the positions of the cams 202a and 202b, the retracting torque T2 generated by the spiral springs 214a and 214b, and the detent torque T3 required to rotate the drive shafts of the motors 203a and 203b when the motors 203a and 203b are turned off is set to satisfy the inequality of T1>T2>T3 on the rotary shafts of the cams 202a and 202b. In other words, the magnitude relation of the holding torque, the retracting torque, and the detent torque satisfies the inequality of T1>T2>T3 on the rotary shafts of the cams 202a and 202b, where "T1" represents the holding torque, "T2" represents the retracting torque, and "T3" represents the detent torque.

As a result, when the motors 203a and 203b are not energized, the cams 202a and 202b move in a direction that the cams 202a and 202b release the pressure against the arms 201a and 201b (cam followers 213a and 213b). Due to such a configuration, even if the motors 203a and 203b are unable to drive while the rollers R1 and R2 are pressed against each other, the pressure between the rollers R1 and R2 can be released. As a result, the present disclosure can provide a cam driver with the enhanced maintainability.

A description is given of a cam driver according to a second embodiment, with reference to FIGS. 7A, 7B, 8A, and 8B.

FIGS. 7A and 7B are diagrams each illustrating a cam driver according to the second embodiment of the present disclosure. More specifically, FIG. 7A illustrates that the cam is at the initial position, and FIG. 7B illustrates that the cam rotates from the initial position.

FIGS. 8A and 8B are diagrams each illustrating a cam driver of a control sample to the cam driver according to the second embodiment. More specifically, FIG. 8A illustrates that the cam is at the initial position, and FIG. 8B illustrates that the cam rotates from the initial position.

In a cam driver 200S of the control sample illustrated in FIGS. 8A and 8B, the spiral outer end P2 of the spiral spring 214 (i.e., the spiral springs 214a and 214b) is bent to form an arc shape. The spiral outer end P2 of spiral spring 214 (the spiral springs 214a and 214b) of the cam driver 200S is fixed to the side face of the cam 202 (the cams 202a and 202b) with, for example, screws to be attached to the cam 202.

In the above-described configuration of the cam driver 200S of the control sample, the direction of the spiral outer end P2 of the spiral spring 214 is not always the same as the rotational direction of the cam 202. For example, while the cam 202 rotates clockwise, in other words, in a rotational direction D1 indicated by a dashed arrow in FIGS. 8A and 8B, around the shaft 208 as a fulcrum, the spiral outer end P2 of the spiral spring 214 is directed to a direction D2 indicated by another dashed arrow in FIG. 8B. As a result, the rotational direction D1 of the cam 202 does not match the direction D2 of the spiral outer end P2 of the spiral spring 214.

As described above, if the cam 202 is rotated to generate the spring force when the rotational direction of the cam 202 and the direction of the spring of the spiral spring 214 do not match (or are changeable), the spring force is not applied equally to the entire area of the spring. As a result, as illustrated in FIG. 8B, the spiral spring 214 may be buckled and deformed. When the spiral spring 214 is buckled and deformed, the amount of deformation is concentrated on a part of the spiral spring 214, so that the spiral spring 214 fails to generate the target spring force. Further, when the spiral spring 214 has undergone plastic deformation due to buckling deformation, the spiral spring 214 may turn to be unusable.

To prevent this inconvenience, in a cam driver 200A of the second embodiment, the spiral outer end P2 of the spiral spring 214 is constantly directed to the rotational direction of the cam 202.

To be more specific, as illustrated in FIGS. 7A and 7B, the spiral outer end P2 of the spiral spring 214 provided for the cam driver 200A is simply cut into a spiral shape. The spiral outer end P2 of the spiral spring 214 is inserted in and retained by a retaining pin 216a (retaining pin 216b) that is fixed on the side face of the cam 202. The retaining pin 216a (216b) has a slit Sa (slit Sb) into which the spiral outer end P2 of the spiral spring 214 is inserted. The retaining pin 216a (216b) is fixed on the side face of the cam 202 by, for example, press-fitting.

The slit Sa (slit Sb) is to be directed in the tangential direction with respect to the center of rotation of the cam 202 (i.e., the shaft 208). In other words, the slit Sa (slit Sb) is made to be directed to the same direction as the rotational direction of the cam 202 (i.e., the direction indicated by the dashed arrow in FIG. 7B). As a result, the spiral outer end P2 of the spiral spring 214 is restricted to constantly be directed to the rotational direction of the cam 202, and this configuration can reduce or prevent the spiral spring 214 from being buckled and deformed along with rotation of the cam 202. The retaining pin 216a (retaining pin 216b) serves as a "retainer".

Note that a sprit pin that is a common pin may be used as the retaining pin 216a (216b). If such a sprit pin is employed as the retaining pin 216a (216b), the direction of the spiral outer end P2 of the spiral spring 214 may have a fluctuation range due to the influence of backlash generated between the plate thickness of the spring material of the spiral spring 214 and the slit width of the split pin. High processing accuracy is required to accurately match the direction of the slit of the split pin with the rotational direction of the cam 202, and it is not easy to fully handle the split pin.

To enable the split pin to be handled as described above, a buckling prevention pin 217a (217b) may be further disposed on the attachment portion (e.g., the side face of the cam 202) to which the spiral spring 214 is attached. The buckling prevention pin 217a (217b) is disposed to contact a part of the spiral spring 214. Providing the buckling prevention pin 217a (217b) disposed on the attachment portion may restrict the direction of the spiral outer end P2 of the spiral spring 214 at two points of the retaining pin 216a (216b) and the buckling prevention pin 217a (217b). Sufficient separation of the retaining pin 216a (216b) and the buckling prevention pin 217a (217b) contributes to a reduction or prevention in deviation in the direction caused by the component accuracy.

The buckling prevention pin 217a (217b) is preferably disposed at a position outside the radius of curvature of the spiral spring 214. The spiral spring 214 is prepared to have a spiral shape provided with a predetermined curvature, and the buckling direction is deformed so as to constantly expand radially outward. The buckling prevention pin 217a (217b) serves as a "buckling preventor".

Figure 9:
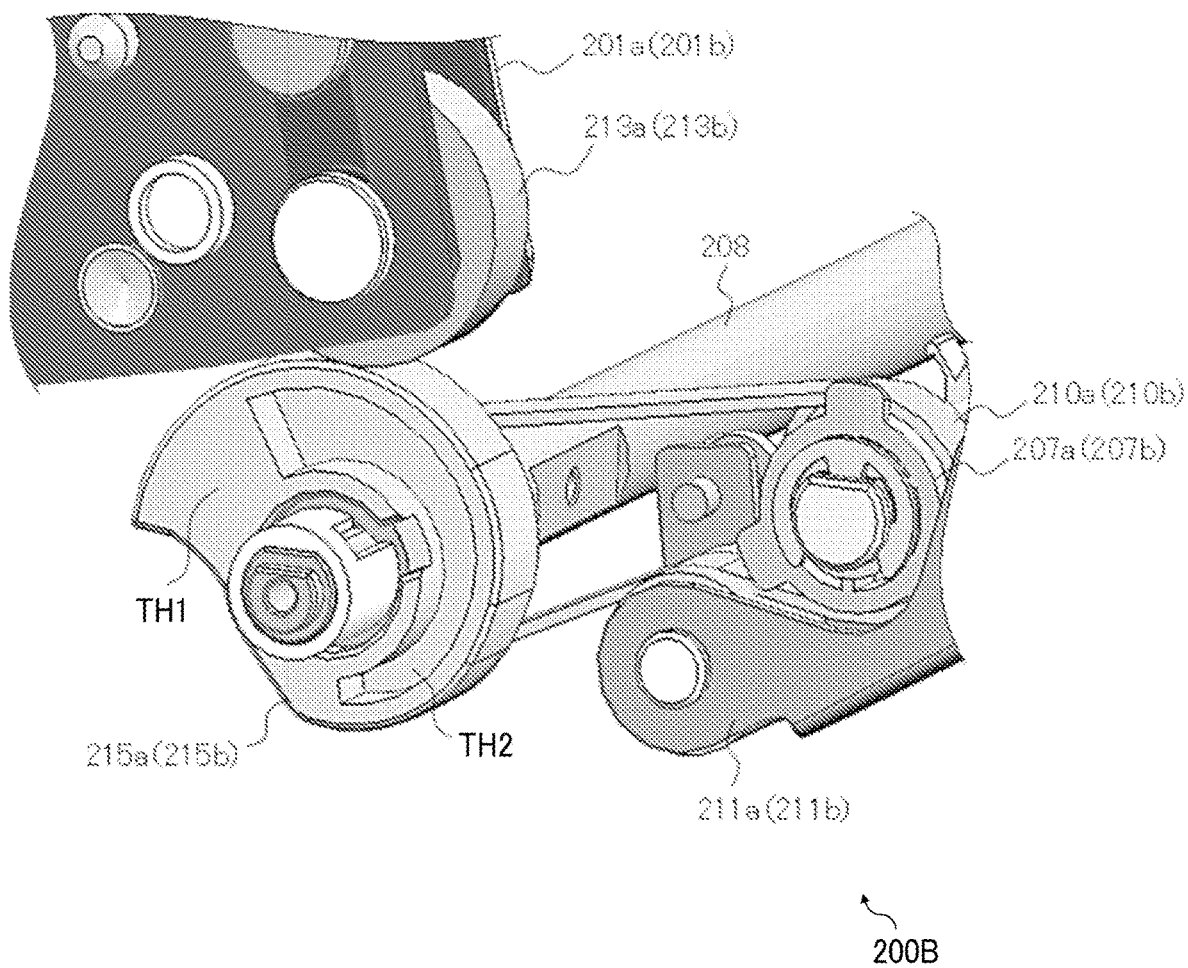
FIG. 9 is a diagram illustrating a retracting torque applicator according to a modification of the above embodiments of the present disclosure.

FIG. 9 is a diagram illustrating a modification of the retracting torque applicator. A cam driver 200B illustrated in FIG. 9 has the configuration like the above-described configuration, except that the cam driver 200B illustrated in FIG. 9 includes cams different from the cams 202a and 202b included in the above-described configuration of the cam driver 200. Note that elements in the configuration of FIG. 9 identical to the elements in the above-described configuration are given like reference numerals, and the descriptions of these elements are omitted.

Each of the cams 215a and 215b (hereinafter, collectively referred to as a "cam 215") of the present modification has a recess (concave portion) in the side face of the cam 215, so that the cam 215 has a thick wall portion TH1 and a thin wall portion TH2. As a result, the center of gravity of the cam 215 is shifted from the center of rotation of the cam 215, so that torque is applied in the retracting direction at the phase position while the cam 215 is in contact with the cam followers 213a and 213b.

In the present modification, the retracting torque may be applied due to the shape of the cam 215. The retracting torque is generated only when the cam 215 enters the specific phase. In this modification, the side face of the cam 215 has the recess to form the thin wall portion TH2. However, if it is difficult to have a recess in the side face of the cam 215, the cam 215 may have a weight on the side face to form the thick wall portion TH1, so as to make an eccentric cam.

As described above, in the present embodiment, the retracting torque applicator includes the cam 215 (i.e., the cams 215a and 215b) whose center of gravity is shifted eccentric from the center of rotation. The cam 215 is also referred to as the eccentric cam 215 (i.e., the eccentric cams 215a and 215b).

In this modification, when the motors 203a and 203b are turned off, the cams 215a and 215b move in a direction where the cams 215a and 215b release the pressure against the arms 201a and 201b (cam followers 213a and 213b), respectively. Due to such a configuration, even if the motors 203a and 203b are unable to drive while the rollers R1 and R2 are pressed against each other, the pressure between the rollers R1 and R2 can be released. As a result, the present disclosure can provide a cam driver with the enhanced maintainability.

FIGS. 10 to 13 illustrate examples of the cam driver according to an embodiment of the present disclosure.

Figure 10:
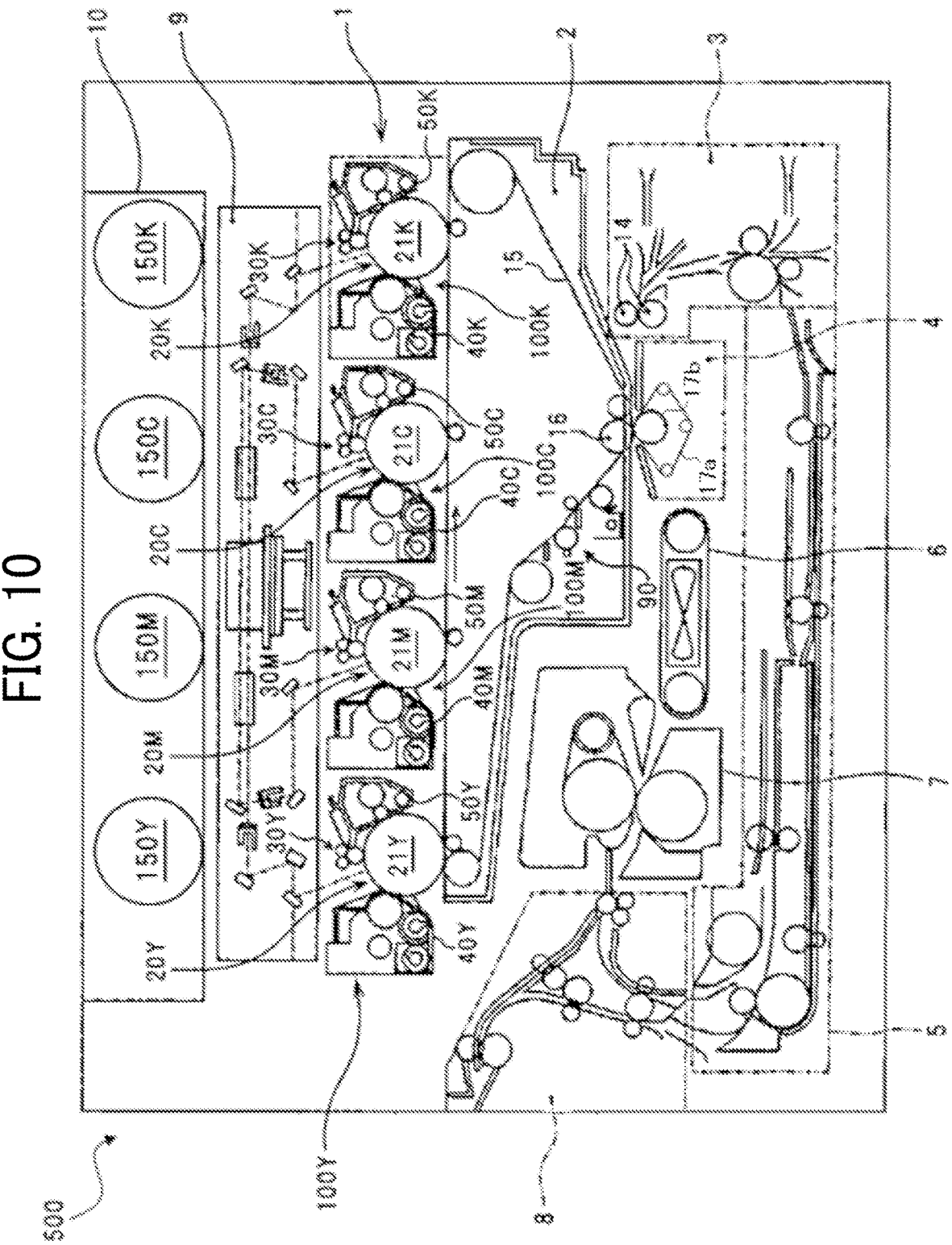
FIG. 10 is a diagram illustrating a first applied case in which a cam driver according to an embodiment of the present disclosure is applied to an image forming apparatus.

FIG. 10 is a diagram illustrating a schematic configuration of an electrophotographic printer as an image forming apparatus including the cam driver in a first configuration, according to an embodiment of the present disclosure.

As illustrated in FIG. 10, a printer 500 includes a tandem image forming device 1 provided with image forming units 100Y, 100M, 100C, and 100K arranged side by side to form toner images of yellow (Y), magenta (M), cyan (C), and black (K), respectively. Each of the image forming units 100Y, 100M, 100C, and 100K has four modules, which are a photoconductor module, a charger module, a development module, and a cleaner module, supported by a common unit frame. The common unit frame allows these modules as an integral part to be attached to and removed from the housing of the printer 500. The photoconductor modules 20Y, 20M, 20C, and 20K include drum-shaped photoconductors 21Y, 21M, 21C, and 21K, respectively. The charger modules 30Y, 30M, 30C, and 30K include respective charging devices. The development modules 40Y, 40M, 40C, and 40K include respective developing devices, each employing a two-component developing system to develop the latent image with developer containing toner and magnetic carriers. The cleaner modules 50Y, 50M, 50C, and 50K include respective cleaners to clean the photoconductors 21Y, 21M, 21C, and 21K, respectively.

The printer 500 further includes an exposure device 9 above the tandem image forming device 1, and a bottle holder 10 above the exposure device 9. The bottle holder 10 holds toner bottles 150Y, 150M, 150C, and 150K containing respective color toners for developing toner images. The toner bottles 150Y, 150M, 150C, and 150K are removable from the bottle holder 10. When any of the toner bottles 150Y, 150M, 150C, and 150K runs out of toner, the empty toner bottle is detached from the bottle holder 10 to be replaced with a new toner bottle.

The printer 500 further includes a transfer device 2 below the tandem image forming device 1. The transfer device 2 includes an intermediate transfer belt 15.

The intermediate transfer belt 15 is an endless belt formed in a single layer or multiple layers of, e.g., polyvinylidene fluoride (PVDF), ethylene-tetrafluoroethylene copolymer (ETFE), polyimide (PI), or polycarbonate (PC). The intermediate transfer belt 15 is wound around a plurality of rollers to rotate clockwise in FIG. 10.

The printer 500 further includes a secondary transfer device 4 below the transfer device 2. The secondary transfer device 4 includes a secondary transfer belt 17a including an endless loop belt, and a secondary transfer roller 17b to press the secondary transfer belt 17a toward a secondary transfer backup roller 16. The secondary transfer belt 17a contacts the outer face of the intermediate transfer belt 15 at a place where the intermediate transfer belt 15 is wound around the secondary transfer backup roller 16, forming a secondary transfer nip region between the intermediate transfer belt 15 and the secondary transfer belt 17a. A secondary transfer bias is applied to the secondary transfer roller 17b and the secondary transfer backup roller 16 is electrically grounded, thereby forming a secondary transfer electric field within the secondary transfer nip region.

The printer 500 further includes a fixing device 7, a conveyance belt 6, a sheet feeding device 3, and a sheet ejection device 8. The fixing device 7 that is disposed on the left of the secondary transfer device 4 in FIG. 10 fixes the toner image that is transferred onto a recording sheet. The fixing device 7 includes a heat roller having a heat generator inside the heat roller. The conveyance belt 6 is disposed between the secondary transfer device 4 and the fixing device 7, to convey the recording sheet on which the toner image has been transferred, toward the fixing device 7. The sheet feeding device 3 is disposed in the lower part of the printer 500 to feed the recording sheet to the secondary transfer device 4. The sheet ejection device 8 that is disposed on the left of the fixing device 7 in FIG. 10 conveys the recording sheet that has passed the fixing device 7, to the outside of the housing of the printer 500 or to a duplex device 5.

Among the plurality of rollers disposed inside the loop of the intermediate transfer belt 15, primary transfer rollers are disposed for yellow, magenta, cyan, and black toner images. The intermediate transfer belt 15 is interposed between the primary transfer rollers for yellow, magenta, cyan, and black toner images and the photoconductors 21Y, 21M, 21C, and 21K, respectively. As a result, the outer face of the intermediate transfer belt 15 and the photoconductors 21Y, 21M, 21C, and 21K contact to form respective primary transfer nip regions. Due to application of the primary transfer bias to each of the primary transfer rollers in a corresponding one of the primary transfer nip regions, respective primary transfer electric fields are formed in the primary transfer nip regions.

When the printer 500 receives image data transmitted from an external device such as a personal computer, the printer 500 starts a print job and starts driving, e.g., the intermediate transfer belt 15. In the tandem image forming device 1, the charging device of each of the charger modules 30Y, 30M, 30C, and 30K uniformly charges the surface of the photoconductors 21Y, 21M, 21C, and 21K to a predetermined charging potential while the photoconductors 21Y, 21M, 21C, and 21K are rotating. Yellow, magenta, cyan, and black electrostatic latent images are formed on the charged surfaces of the photoconductors 21Y, 21M, 21C, and 21K by optical scanning using laser light emitted from the exposure device 9 based on the image data. The development modules 40Y, 40M, 40C, and 40K develop the yellow, magenta, cyan, and black electrostatic latent images into yellow, magenta, cyan, and black toner images, respectively. Then, the yellow, magenta, cyan, and black toner images are sequentially transferred onto the intermediate transfer belt 15 such that the yellow, magenta, cyan, and black toner images are superimposed one atop another on the surface of the intermediate transfer belt 15 in a primary transfer process. As a result, a four-color composite toner image (hereinafter, a toner image) is formed on the intermediate transfer belt 15. After the yellow, magenta, cyan, and black toner images are transferred onto the intermediate transfer belt 15, transfer residual toner remaining on the surfaces of the photoconductors 21Y, 21M, 21C, and 21K are removed from the surfaces of the photoconductors 21Y, 21M, 21C, and 21K by the respective cleaning devices of the cleaner modules 50Y, 50M, 50C, and 50K, respectively.

Along with the formation of the toner image, the sheet feeding device 3 conveys a recording sheet to a registration roller pair 14 until the recording sheet contacts the registration roller pair 14. When the recording sheet contacts the registration roller pair 14, the conveyance of the recording sheet is temporarily stopped. Then, the registration roller pair 14 starts rotating again when the toner image on the intermediate transfer belt 15 reaches the secondary transfer nip region. The recording sheet that is conveyed again along with rotation of the registration roller pair 14 meets the toner image on the intermediate transfer belt 15 in the secondary transfer nip. Thus, in synchrony with movement of the toner image on the intermediate transfer belt 15, the toner image is transferred from the intermediate transfer belt 15 onto the recording sheet in the secondary transfer nip region.

After the toner image has been transferred onto the recording sheet in the secondary transfer nip region, the recording sheet is conveyed by the conveyance belt 6 to the fixing device 7 where the toner image on the recording sheet is fixed to the recording sheet by application of heat and pressure. Thereafter, the recording sheet is conveyed to the sheet ejection device 8. The sheet ejection device 8 includes a separation claw to change the course of conveyance of the recording sheet between the direction to a sheet ejection tray (on the left side of the printer 500 in FIG. 10) disposed on the outside of the printer 500 and the direction to the duplex device 5 in the lower part of the printer 500. The duplex device 5 conveys the reversed recording sheet to the secondary transfer nip region again while inverting the recording sheet upside down. The recording sheet is inverted and conveyed again to the secondary transfer nip region where the toner image is transferred onto the back side (second face) of the recording sheet. Thereafter, the sheet ejection device 8 ejects the recording sheet onto the sheet ejection tray.

The printer 500 further includes an intermediate transfer belt cleaner 90 that removes transfer residual toner remaining on the surface of the intermediate transfer belt 15 after the intermediate transfer belt 15 has passed the secondary transfer nip region. In the printer 500 having the above-described configuration, the cam driver 200 may be applied to, for example, a contact-separation mechanism of the secondary transfer belt 17a with respect to the secondary transfer backup roller 16.

Figure 11:
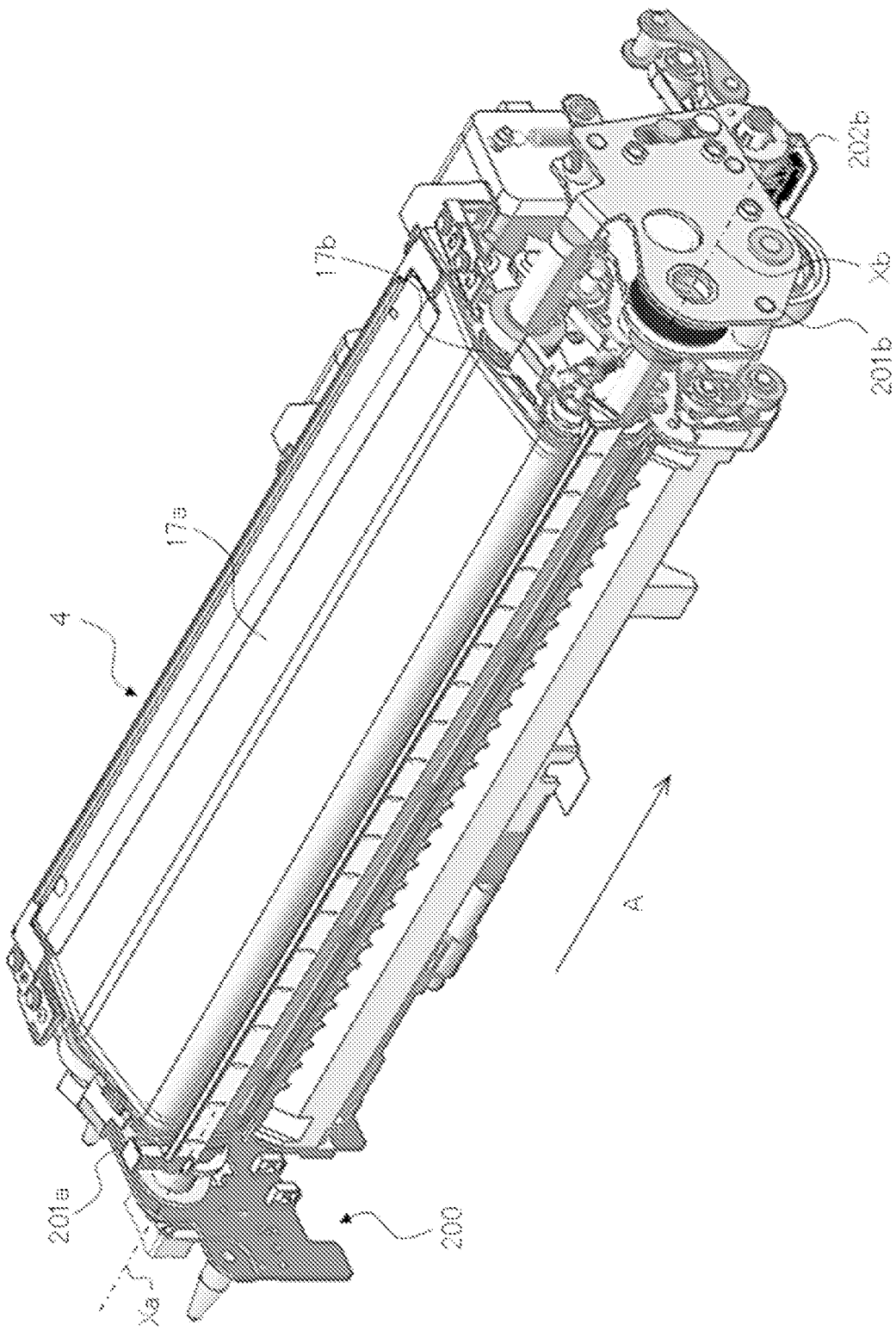
FIG. 11 is a perspective view of an object unit mounted on the cam driver according to the first applied case of the present disclosure.

FIG. 11 is a perspective view of an object unit in its entirety, which is mounted on the cam driver 200, according to the first applied case of the present disclosure.

In the first applied case of the present disclosure, the secondary transfer device 4 is adopted as the object unit 300 illustrated in FIG. 2.

The cam driver 200 supports the secondary transfer device 4 that serves as an object unit, between the arm 201a and the arm 201b. In other words, the arms 201a and 201b of the cam driver 200 support the secondary transfer device 4. A part of the secondary transfer belt 17a illustrated in FIG. 10 is exposed through the top face of the secondary transfer device 4, and the secondary transfer roller 17b is disposed on the bottom side (back side) of the secondary transfer belt 17a to press the secondary transfer belt 17a toward the secondary transfer backup roller 16. Due to the above-described configuration, as the cam 202a rotates, the arm 201a rotates around the axis Xa as a fulcrum via the cam follower of the cam 202a. Similarly, as the cam 202b (see FIG. 2) rotates, the arm 201b rotates around the axis Xb as a fulcrum via the cam follower of the cam 202b. As a result, the secondary transfer device 4 rotates around the axes Xa and Xb each as a fulcrum, together with the arms 201a and 201b. When the cam driver 200 is turned off while the secondary transfer nip region is formed in the printer 500, the retracting torque acts on the cams 202a and 202b in the direction to cancel the secondary transfer nip region.

For example, some office printers may employ an interlock mechanism that cuts off electrical connection with a motor or motors when the cover of the printer opens. If the printer includes such an interlock mechanism, opening the cover of the printer cuts off the holding current of the motor or motors. For this reason, when the holding torque T1, the reverse torque T2, and the detent torque T3 have the relation set as expressed by the inequality of T1>T2>T3, the secondary transfer nip region is cancelled reliably.

In the first configuration, the cam driver 200 on which the secondary transfer device 4 is mounted is drawable in a direction indicated by arrow A in FIG. 11 with respect to the printer 500. Due to such a configuration, if the cam driver 200 is turned off in the image formation process and some recording sheets are left in the secondary transfer device 4, the secondary transfer nip region is cancelled, then the cam driver 200 and the secondary transfer device 4 are drawn. By so doing, the recording sheets left in the printer 500 are removed from the secondary transfer device 4.

Figure 12:
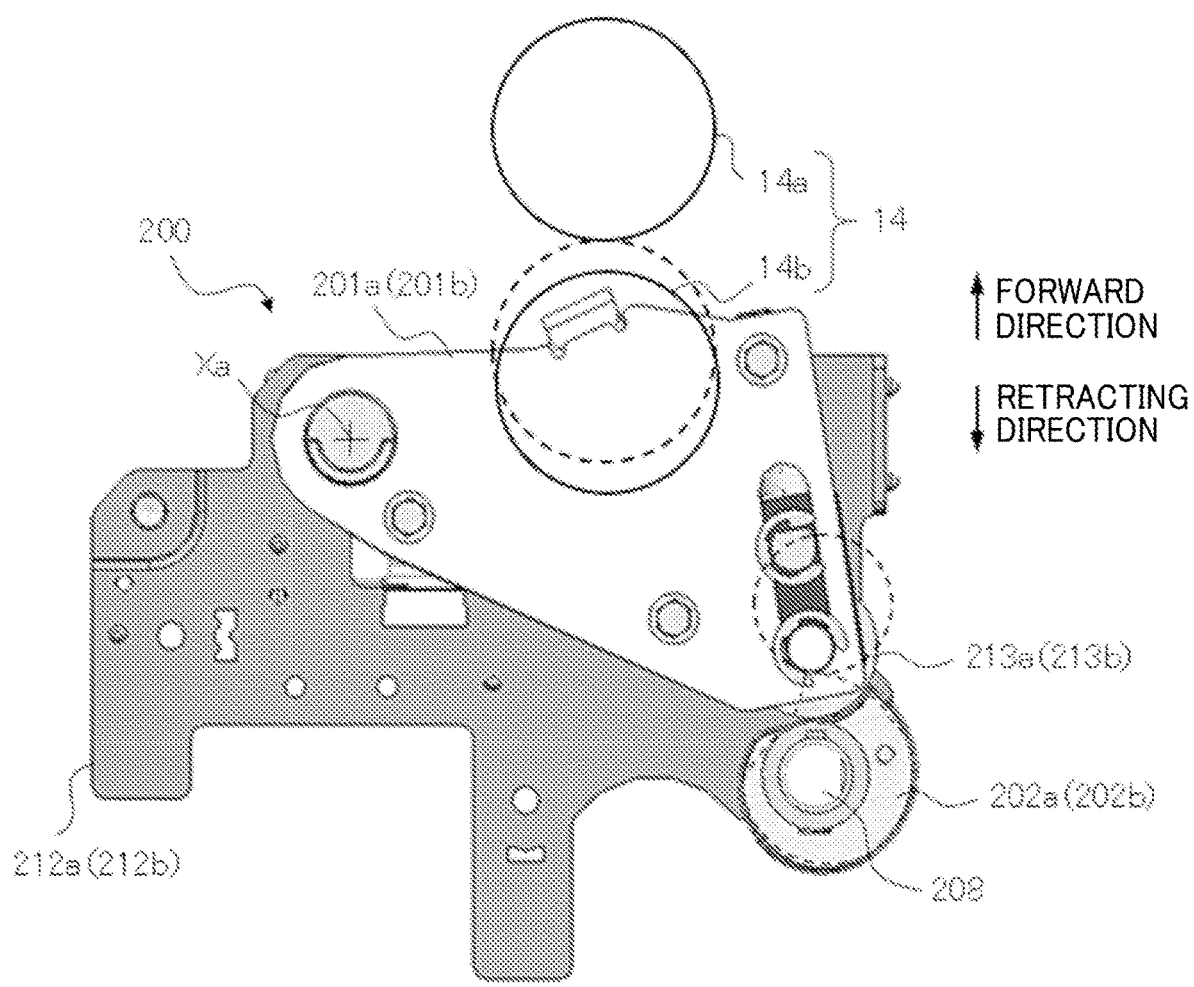
FIG. 12 is a diagram illustrating a second applied case of a cam driver according to an embodiment of the present disclosure.

FIG. 12 is a diagram illustrating the cam driver in a second configuration, according to an embodiment of the present disclosure.

In the second configuration of the cam driver 200 in FIG. 12, the registration roller pair 14 of the printer 500 illustrated in FIG. 10 is applied.

The cam driver 200 is provided with a roller 14b that is one roller of the registration roller pair 14. The registration roller pair 14 includes a roller 14a and the roller 14b. The arms 201a and 201b rotatably support the roller 14b. When the cams 202a and 202b are at the respective positions indicated by the solid line in FIG. 12, the arms 201a and 201b are at the most retreated positions, and the roller 14b is also at a position separated from the roller 14a as indicated by the solid line in FIG. 12. The roller 14a of the registration roller pair 14 is fixed at a given position on the housing of the printer 500. When the cams 202a and 202b rotate clockwise to move to the respective positions indicated by the broken line in FIG. 12, the arms 201a and 201b are at the most forward positions, so that the roller 14b presses the roller 14a as indicated by the broken line in FIG. 12.

Like the first configuration, if the cam driver 200 in the second configuration is turned off while the registration roller pair 14 forms the nip region, the retracting torque acts on the cams 202a and 202b in the direction to cancel the nip region formed between the rollers of the registration roller pair 14. By so doing, the second configuration achieves the effect like the effect of the first configuration. Like the first configuration, the cam driver 200 on which the roller 14b is mounted may be drawable from the printer 500 in the second configuration, so as to enhance the accessibility in, for example, maintenance work.

Figure 13:
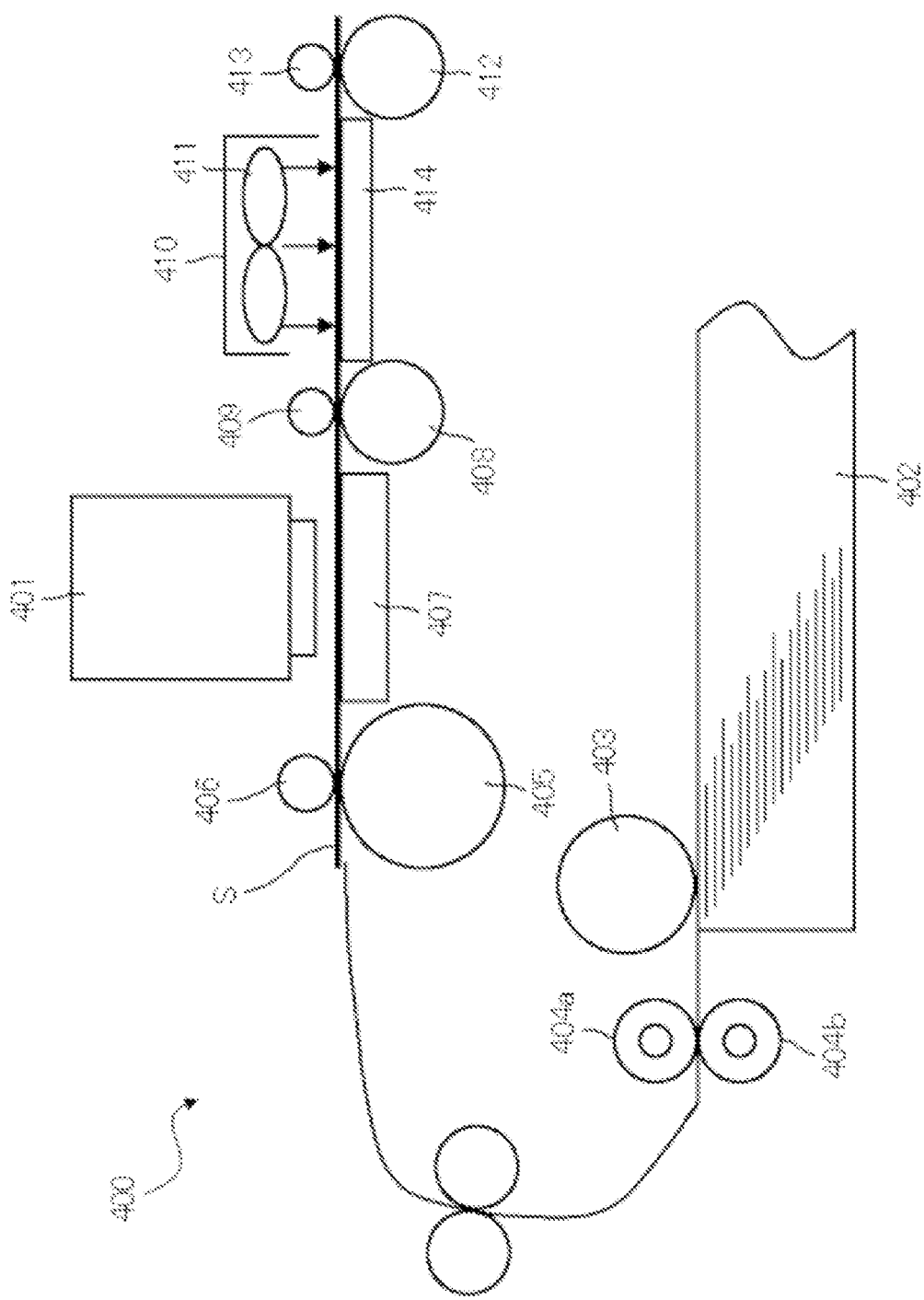
FIG. 13 is a diagram illustrating a third applied case in which a cam driver according to an embodiment of the present disclosure is applied to an image forming apparatus.

FIG. 13 is a diagram illustrating a schematic configuration of an inkjet printer as an image forming apparatus including the cam driver in a third configuration, according to an embodiment of the present disclosure.

A printer 400 in the third configuration illustrated in FIG. 13 includes an inkjet head 401, a sheet tray 402, a feed roller 403, and sheet thickness detection rollers 404a and 404b forming a sheet thickness detection roller pair. The head 401 may be, i.e., a heating element type, a piezoelectric element type, a micro electro mechanical system (MEMS) element type, or an electrostatic element type. The sheet tray 402 accommodates recording sheets S. The feed roller 403 picks up the recording sheets S one by one to feed each recording sheet S from the sheet tray 402. Subsequently, the sheet thickness detection roller pair including the sheet thickness detection rollers 404a and 404b detects the thickness of each recording sheet S.

The printer 400 further includes a line feed (LF) roller 405, a pinch roller 406, an exposure glass 407, a first ejection roller 408, a first roller 409, and a fuser 410. The recording sheet S is conveyed to a position immediately below the head 401 while being nipped in the conveyance nip region formed between the LF roller 405 and the pinch roller 406. An encoder is provided coaxially with the LF roller 405, so that the number of rotations of the LF roller 405 can be detected by converting the feed distance of the recording sheet S. The exposure glass 407 supports the recording sheet S from below. The first ejection roller 408 and the first roller 409 nip and convey the recording sheet S that has passed under the head 401. The fuser 410 includes an air blowing fan 411 to heat the recording sheet S having the ink discharged from the head 401 on the surface, and dry the ink on the recording sheet S by blowing warm air at a given temperature to the recording sheet S.

The fuser 410 also includes a temperature sensor (thermistor) to detect the temperature of warm air.

The printer 400 further includes a second ejection roller 412 and a second roller 413 that are disposed downstream from the fuser 410 in the conveyance direction of the recording sheet S. The second ejection roller 412 and the second roller 413 nip and convey the recording sheet S that has passed through the fuser 410. The printer 400 further includes an ejection exposure glass 414 disposed facing the fuser 410. Like the exposure glass 407, the ejection exposure glass 414 supports the recording sheet S from below. Thus, the fuser 410 dries the ink discharged by the head 401.

In the printer 400 having the above-described configuration, for example, when the configuration allows the LF roller 405 and the pinch roller 406 to contact with and separate from each other, the LF roller 405 or the pinch roller 406 may be mounted on the cam driver 200 for implementation. Alternatively, when the configuration allows the first ejection roller 408 and the first roller 409 to contact with and separate from each other, the first ejection roller 408 or the first roller 409 may be mounted on the cam driver 200 for implementation. Alternatively, when the configuration allows the second ejection roller 412 and the second roller 413 to contact with and separate from each other, the second ejection roller 412 or the second roller 413 may be mounted on the cam driver 200 for implementation.

Further, the cam driver 200 is not limited to the roller pair but is applicable to vertical movement of the head 401. When the present disclosure is applied to the vertical movement of the head 401, the head 401 is fixed to the arms 201a and 201b of the cam driver 200 so that the head 401 can move in the vertical direction.

By so doing, the distance between the head 401 and the exposure glass 407 can increase to achieve easier removal of the recording sheet S remaining under the head 401.

The above-described embodiments are given by way of example, and, for example, the following aspects of the present disclosure can provide the following advantages.

First Aspect

A cam driver (for example, the cam driver 200) includes a support (for example, the arms 201*a* and 201*b*), a cam (for example, the cams 202*a* and 202*b*), a motor (for example, the motors 203*a* and 203*b*), and a retracting torque applicator (for example, the spiral springs 214*a* and 214*b*, the eccentric cams 215*a* and 215*b*). The support supports an object (for example, the object unit 300 in FIG. 2, the roller R1 in FIG. 4, the second transfer device 4, the roller 14*b*). The cam moves the support. The motor rotates the cam and maintains a position of the cam. The retracting torque applicator applies torque to the cam in a direction to move the object away from a counter object (for example, the roller R2 in FIG. 4) that faces the object.

Second Aspect

According to the first aspect, the support (for example, the arms 201*a* and 201*b*) includes a rotary axis (for example, the axes Xa and Xb) as a fulcrum around which the support rotates. The support rotates around the rotary axis along with rotation of the cam (for example, the cams 202*a* and 202*b*) to move the object (for example, the object unit 300 in FIG. 2, the roller R1 in FIG. 4, the second transfer device 4, the roller 14*b*) toward or away from the counter object (for example, the roller R2 in FIG. 4). The cam is disposed at a position lower than a position of the rotary axis of the support.

Third Aspect

According to the first aspect or the second aspect, the motor (for example, the motors 203*a* and 203*b*) generates holding torque (for example, the holding torque T1) to hold a position of the cam (for example, the cams 202*a* and 202*b*), the retracting torque applicator (for example, the spiral springs 214*a* and 214*b*) generates retracting torque (for example, the retracting torque T2), and the motor has a drive shaft and the drive shaft of the motor is driven to rotate by detent torque (for example, the detent torque T3) when the motor is turned off. T1>T2>T3 is satisfied on a rotary shaft (for example, the shaft 208) coupled to the cam, where T1 denotes the holding torque, T2 denotes the retracting torque, and T3 denotes the detent torque.

Fourth Aspect

According to any one of the first to third aspects, the retracting torque applicator (for example, the spiral springs 214*a* and 214*b*) includes a spiral spring (for example, the spiral springs 214*a* and 214*b*) disposed between the cam (for example, the cams 202*a* and 202*b*) and the rotary shaft (for example, the shaft 208) coupled to the cam.

Fifth Aspect

According to the fourth aspect, the retracting torque applicator (for example, the spiral springs 214*a* and 214*b*) generates the retracting torque (for example, the retracting torque T2) by winding the spiral spring (for example, the spiral springs 214*a* and 214*b*).

Sixth Aspect

According to the fifth aspect, the retracting torque applicator (for example, the spiral springs 214*a* and 214*b*) generates retracting torque (for example, the retracting torque T2) by winding the spiral spring (for example, the spiral springs 214*a* and 214*b*). The retracting torque has a magnitude between a maximum torque of the motor (for example, the motors 203*a* and 203*b*) and detent torque (for example, the detent torque T3) applied on the cam (for example, the cams 202*a* and 202*b*).

Seventh Aspect

According to any one of the first to third aspects, the retracting torque applicator (for example, the spiral springs 214*a* and 214*b*) is an eccentric cam (for example, the eccentric cams 215*a* and 215*b*) to displace a center of balance of the cam (for example, the cams 202*a* and 202*b*) from a center of rotation of the cam.

According to the configurations of the first aspect to the seventh aspect, when the motor is turned off, the cam moves in a direction where the cam releases the pressure against the support. Due to such a configuration, even if the motor is unable to drive while the object and the counter object are pressed against each other, the pressure between the object and the counter object can be released. As a result, the present disclosure can provide a cam driver with the enhanced maintainability.

Eighth Aspect

According to any one of the fourth to sixth aspects, the cam (for example, the cams 202*a* and 202*b*) includes a retainer (for example, the retaining pins 216*a* and 216*b*) to retain an outer end (for example, the spiral outer end P2) of the spiral spring (for example, the spiral springs 214*a* and 214*b*) to be directed to a rotational direction (for example, the direction indicated by the broken line in FIG. 7B) of the cam.

Ninth Aspect

According to the eighth aspect, the retainer (for example, the retaining pins 216*a* and 216*b*) has a slit (for example, the slits Sa and Sb) into which the outer end (for example, the spiral outer end P2) of the spiral spring (for example, the spiral springs 214*a* and 214*b*) is inserted. The slit is directed to a same direction as the rotational direction (for example, the direction indicated by the broken line in FIG. 7B) of the cam (for example, the cams 202*a* and 202*b*).

According to the configurations of the eighth aspect and the ninth aspect, the retainer retains the spiral spring such that the outer end of the spiral spring is constantly directed to the rotational direction of the cam. Due to such a configuration, the deformation of the spiral spring is less concentrated to a part of the spiral spring. As a result, the buckling deformation and plastic deformation of the spiral spring can be prevented.

Tenth Aspect

According to any one of the fourth, fifth, sixth, eighth, and ninth aspects, the cam (for example, the cams 202*a* and 202*b*) includes a buckling preventer (for example, the buckling prevention pins 217*a* and 217*b*) being in contact with a part of the spiral spring (for example, the spiral springs 214*a* and 214*b*) to prevent buckling of the spiral spring.

According to the configuration of the tenth aspect, deviation in the direction of the spiral spring due to the component accuracy is further reduced or prevented.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

What is claimed is:

1. A cam driver comprising:
   a support configured to support an object;
   a cam configured to move the support;
   a motor configured to rotate the cam and maintain a position of the cam; and
   a retracting torque applicator configured to apply a retracting torque to the cam in a direction to move the object away from a counter object that faces the object;
   wherein the retracting torque applicator includes a spiral spring;
   wherein an outer diameter of the spiral spring is configured to be changed as the spiral spring is wound and unwound, and
   wherein during a period in which the spiral spring is wound in a winding direction, the retracting torque applicator applies the retracting torque to the cam.

2. The cam driver according to claim 1,
   wherein the support includes a rotary axis as a fulcrum around which the support rotates,
   wherein the support is configured to rotate around the rotary axis along with rotation of the cam to move the object toward or away from the counter object, and
   wherein the cam is disposed at a position lower than a position of the rotary axis of the support.

3. The cam driver according to claim 1,
   wherein the motor is configured to generate holding torque to hold the position of the cam,
   wherein the retracting torque applicator is configured to generate the retracting torque,
   wherein the motor has a drive shaft and the drive shaft of the motor is driven to rotate by detent torque when the motor is turned off, and
   wherein a condition that T1 is greater than T2, and T2 is greater than T3 is satisfied on a rotary shaft coupled to the cam, where T1 denotes the holding torque, T2 denotes the retracting torque, and T3 denotes the detent torque.

4. The cam driver according to claim 1,
   wherein the retracting torque applicator is configured to generate the retracting torque by winding the spiral spring.

5. The cam driver according to claim 1,
   wherein the retracting torque applicator is configured to generate the retracting torque by winding the spiral spring, and
   wherein the retracting torque has a magnitude between a maximum torque of the motor and detent torque applied on the cam.

6. The cam driver according to claim 1,
   wherein the cam includes a retainer to retain an outer end of the spiral spring to be directed to a rotational direction of the cam.

7. The cam driver according to claim 6,
   wherein the retainer has a slit into which the outer end of the spiral spring is inserted, and
   wherein the slit is directed to a same direction as the rotational direction of the cam.

8. The cam driver according to claim 1,
   wherein the cam includes a buckling preventer being in contact with a part of the spiral spring to prevent buckling of the spiral spring.

9. The cam driver according to claim 1,
   wherein the retracting torque applicator includes an eccentric cam to displace a center of balance of the cam, configured to move the support, from a center of rotation of the cam configured to move the support.

10. A transfer device comprising the cam driver according to claim 1.

11. An image forming apparatus comprising the cam driver according to claim 1.

12. An image forming apparatus comprising a transfer device including the cam driver according to claim 1.

* * * * *